C. J. PETERSON.
MOTION PICTURE MACHINE.
APPLICATION FILED JULY 9, 1918.
1,324,266.
Patented Dec. 9, 1919.
2 SHEETS—SHEET 2.
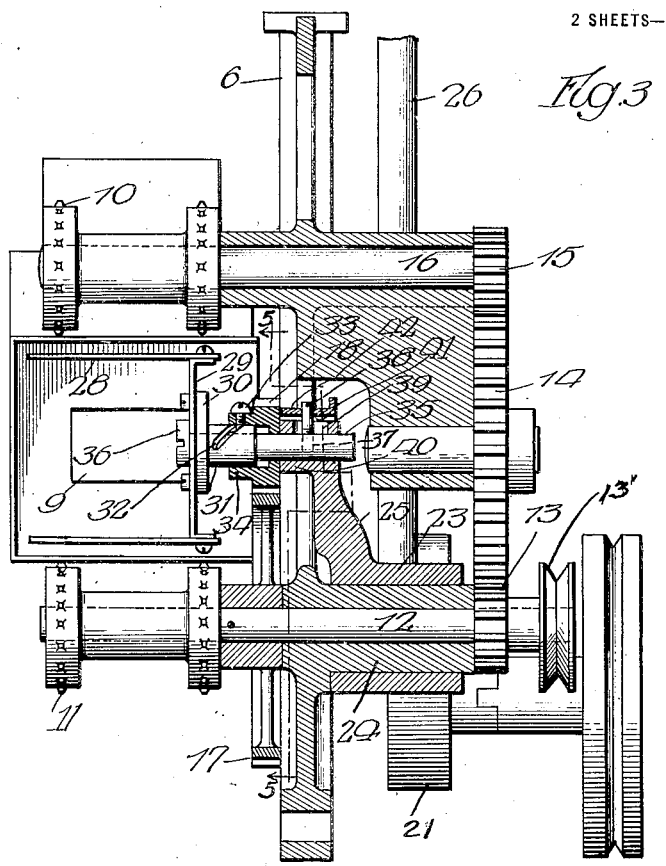
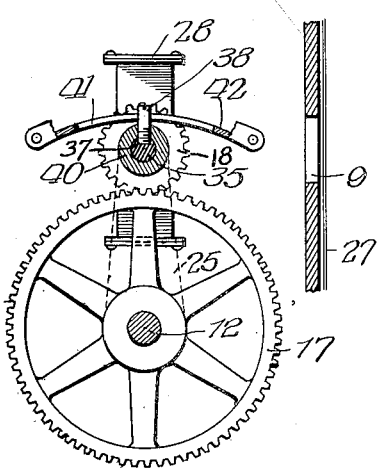
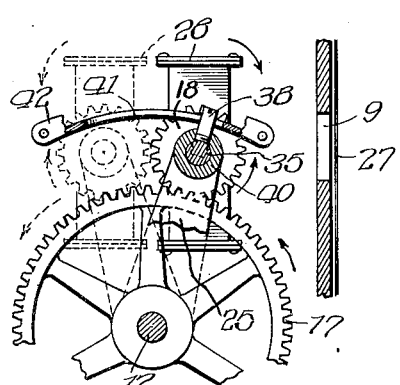
Inventor
Christen J. Peterson
By Wm P. Bond Atty

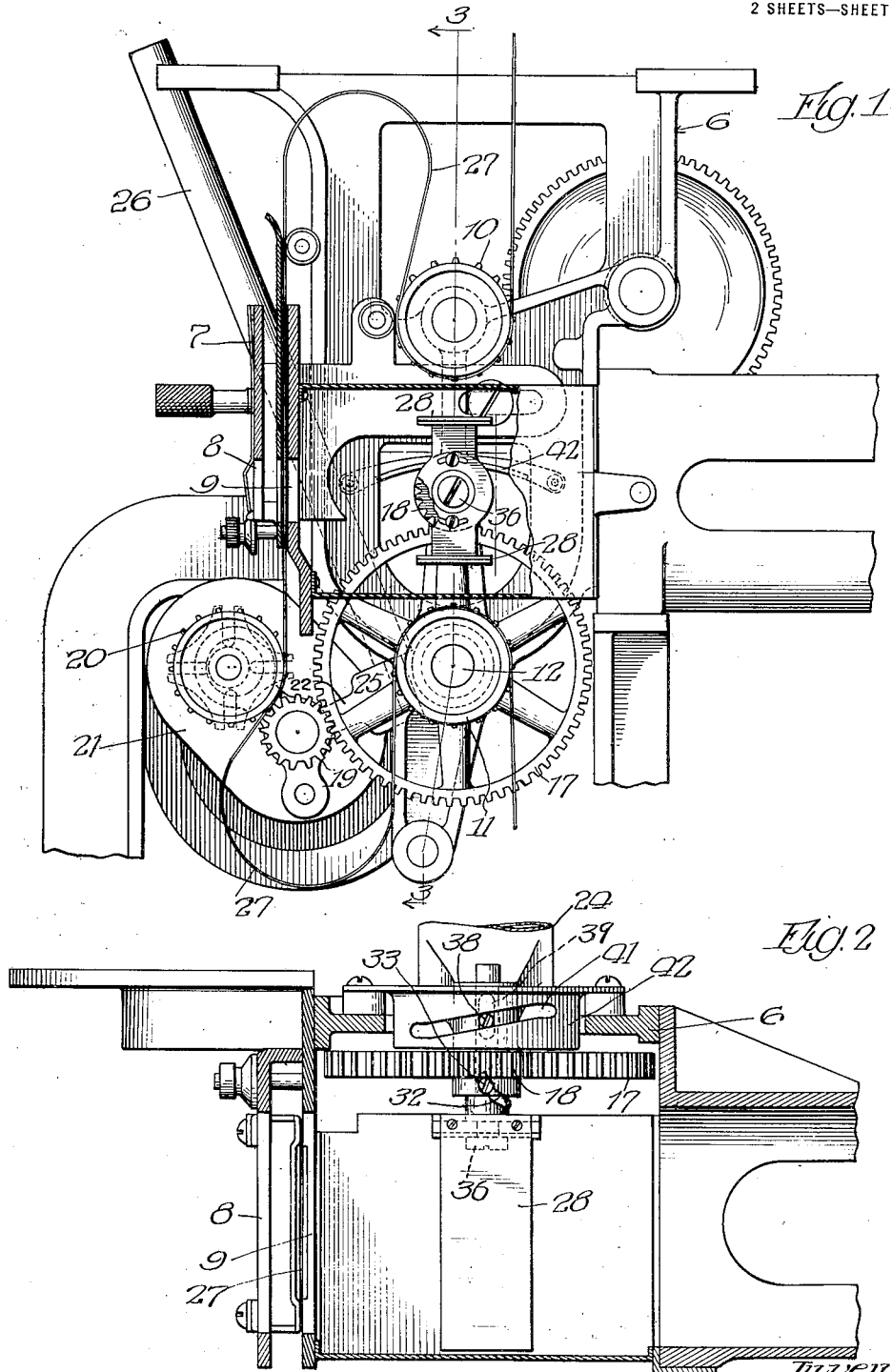

UNITED STATES PATENT OFFICE.

CHRISTEN J. PETERSON, OF CHICAGO, ILLINOIS.

MOTION-PICTURE MACHINE.

1,324,266.  Specification of Letters Patent.  Patented Dec. 9, 1919.

Application filed July 9, 1918. Serial No. 244,040.

*To all whom it may concern:*

Be it known that I, CHRISTEN J. PETERSON, a citizen of the United States, residing at Chicago, in the county of Cook and State of Illinois, have invented certain new and useful Improvements in Motion-Picture Machines, of which the following is a specification.

The present invention relates to means for moving the film for the purpose of framing the picture with respect to the light aperture, and maintaining during such framing operation a synchronous relation between the intermittent sprocket or film feeding mechanism and the shutter.

The principal object of the invention is to provide means for imparting to the shutter during the film framing operation a movement which will maintain it in proper angular disposition with respect to the light aperture.

Further objects of the invention are, to provide a common driving means for the film feeding mechanism and the shutter means; and to maintain the connection from such driving means to the film actuating mechanism and shutter means during the framing operation, whereby synchrony of movement between the mechanisms is maintained.

A further object of the invention is to provide means for imparting a secondary movement to the shutter during the film framing operation, whereby the shutter is maintained in proper angular relation to the light aperture.

A further object of the invention is to provide a single actuating member for moving the parts in framing operation.

The invention further consists in the features of construction and combination of parts hereinafter described and claimed.

In the drawings:

Figure 1 is a side view, partly in section, of the head of a motion-picture machine, embodying the subject matter of the present invention;

Fig. 2 is a plan view, partly in section, showing the mechanism of the present invention;

Fig. 3 is a section on line 3—3 of Fig. 1, looking in the direction of the arrows;

Fig. 4 is a diagrammatic view, showing the shutter in one position; and

Fig. 5 is a view similar to Fig. 4, showing the shutter in one adjusted position by means of full lines and in another adjusted position by means of dotted lines.

In the art to which the present invention relates, in connection with motion-picture machines, means must be provided for giving to the film at certain times a movement, other than the ordinary feeding movement, to perform what is known as the framing operation, which consists in bodily moving the film so as to bring the pictures in correct alinement with the light aperture.

In the present invention, the means which are provided for carrying out this film framing operation are of a similar character to the means shown and described in Letters Patent No. 1,258,704, granted to me March 12, 1918, for motion-picture machines, the present invention dealing with an improvement on the invention set forth in the above patent with respect to the feature of maintaining the shutter in proper angular disposition to the light aperture while the framing operation takes place.

Referring now to the drawings, the invention is illustrated in connection with the frame 6 of the head of a moving-picture machine, which frame may be of any suitable style and arrangement. Mounted upon said frame is a film gate 7 of any suitable design, having therein a light aperture 8; and in alinement with the aperture 8 is a light aperture 9 in the frame. The frame carries a film feeding sprocket 10 and a take-up sprocket 11. Also carried by the frame is a main drive shaft 12, to which is attached a pulley 13' or other actuating member (see Fig. 3), which shaft carries a pinion 13 on its outer end meshing with a gear 14, which actuates a pinion 15 connected to a shaft 16 carrying the upper feed sprocket 10.

Also carried by the shaft 12 is the lower take-up sprocket 11; and mounted on said shaft, intermediate thereof, is a gear 17. This gear 17 meshes with a shutter actuating pinion 18 and a pinion 19, which latter actuates suitable mechanism for intermittently driving a film actuating sprocket 20, and which intermittent mechanism and sprocket constitute a film actuating mechanism. The gears 17, 18 and 19 constitute a planetary train of gears, and this arrangement is described in detail in Letters Patent No. 1,258,704 heretofore referred to. Although in the present invention the film actuating mechanism is of the intermittent type, it is understood that this is not deemed to constitute any limitation on the invention.

The film actuating mechanism is contained within a housing 21 which is connected by an arm 22 to a bearing 23 upon a hub 24 on the shaft 12 (see Fig. 3). A web-member or arm 25 extends from the bearing 23 and forms a support for the shutter actuating mechanism and shutter carrying shaft. A member 26, in the form of a rod, is connected to the bearing 23, and when this rod is moved, the bearing will be rocked about the center of the shaft 12; and by reason of the connection to the casing carrying the film actuating mechanism and to the mechanism which actuates the shutter, these mechanisms will, upon movement of the rod 26, be moved in unison about the center of the shaft 12. The pinions 18 and 19, being an equal distance from the center of said shaft, will move about the periphery of the gear 17 and will thus be continuously maintained in driving engagement therewith, thus constantly maintaining the driving connection between the film actuating mechanism and the shutter actuating mechanism.

The foregoing arrangement is fully described in my Patent No. 1,258,704 and will not be gone into in detail at this time, reference being made to said patent for further description thereof.

It is obvious that as the casing which carries the film actuating mechanism moves up or down, it will correspondingly move the intermittent sprocket 20, so there will be a push or pull exerted upon the film 27, bodily moving it with respect to the light aperture to perform the framing operation. This feature is also described in my Patent No. 1,258,704.

As the gears 18 and 19 travel about the central gear 17, there will be an abnormal movement imparted to the pinions 18 and 19 by traveling over the surface of the central gear. With respect to the shutter gear 18, which actuates the shutter mechanism, unless the abnormal movement thereof is compensated for in some way, the shutter, after the framing operation, will have moved to assume an angular position with regard to the light aperture, which is improper. That is, it will assume a position so that when normal operation is resumed, the opaque portions 28 of the shutter will reach the light aperture too soon and act to cut off the light while the picture is still at rest; or said opaque portions will assume a position so that when normal operation is resumed, they will act to cut off the light too late and allow the picture to show while it is moving. In other words, the shutter would not be in exact timing so as to cut the light off precisely as the picture moves past the light aperture, and a flickering would result. It is to eliminate this undesirable angular disposition of the shutter that the present invention has been devised.

The shutter comprises the opaque portions 28 heretofore referred to, which are in the form of elongated blades spaced apart from one another (see Fig. 3). These blades are joined together by a tie-plate 29. This tie-plate has secured thereto a flange 30 extending from a hub or sleeve 31. This hub has formed therein a diagonal slot 32, into which projects the end of a stem 33 mounted in a flange 34 extending from the pinion 18; and the sleeve and hub are connected together only by the aforesaid slot and pin connection. Extending loosely through the sleeve 31 is a shaft 35, upon the outer end of which is a head 36 resting against the tie-plate 29, but said head and plate have no positive connection with one another.

Upon the outer end of said shaft 35 is a recess 37, which receives and retains the end of a pin 38; and this pin extends through and travels in an elongated slot 39 formed in a sleeve 40 on the upper end of the connecting web 25 from the bearing 23. The pin also extends through a diagonal slot 41 (see Fig. 2) formed in a plate 42 fixedly secured to the frame of the head.

Assume now that the rod 26 has been moved to effect a framing operation: The web 25 from the bearing 23 will also be moved, and this will bodily carry the shaft 35, together with the pinion 18, shutter and associated parts in the direction of movement of the web 25. Owing to the fact that the plate 42 is fixed and that the pin 38 which is connected to the shaft 35 moves with said shaft, it is obvious that the pin 38 will be forced along the slot 41 in the plate 42. This slot, being of angular disposition, will move the pin in an in or out direction with respect to the shutter, depending upon whether the rod 26 is actuated in one direction or the other. In such movements either in or out, the said pin will travel in the slot 39 in a direction lengthwise of the shaft 35, and since the pin is connected to the shaft 35, the shaft will be moved longitudinally.

Assume that the movement of the shaft 35 is toward the shutter: It will move the head 36 away from the connecting plate 29. The continued revolving of the pinion 18 will cause the stem 33 carried thereby to advance in the diagonal slot 32 of the sleeve 31 and move the sleeve and shutter in the direction of movement of the head. So long as the head 36 remains in engagement with the connecting plate 29, the action of the stem 33 against the walls of the slot 32, tending to move the sleeve 31, will be resisted by the head abutting against the tie-plate, so that since the sleeve cannot advance, the stem 33 will act in conjunction with the walls of the slot 32 to form a driving connection between the pinion 18 and the shutter. But when the head 36 is moved away from the connecting plate by the movement of the shaft 35, then immediately the stem 33 will act against the walls of the slot 32 to force the sleeve 31 longitudinally in a direction toward the head; and by reason of the slot 32 being diagonal, said movement will impart a rotative movement as well as a sliding movement to said sleeve. The direction of rotative movement of the sleeve 31 will be counter to the direction of rotation of the pinion 18, and so, although the pinion be abnormally moved one way or the other by turning about the periphery of the gear 17, the movement of the shaft 35, which will take place simultaneously with the abnormal movement of the pinion, will cause the shutter to be turned in a counter-direction through the agency of the inclined slot 32 and the stem 33, thus counteracting the abnormal movement of the pinion 18.

Therefore there will be no abnormal turning movement of the shutter during the framing operation and the shutter will, when normal operation is resumed, continue in the same angular disposition with respect to the light aperture that it was before the framing operation, and will thus act in proper timing to cut off the light.

When the shaft 35 is moved toward the shutter the head 36 is advanced away from the connecting plate 29, and hence the action of the stem 33 and slot 32 will cause the shutter to move bodily outward until it contacts with the head 36, after which movement of the sleeve 31 is checked. The stem can then advance no farther in the diagonal slot 32, and the shutter and pinion are turned in unison.

When the shaft 35 is moved in the opposite direction or to the right as seen in Fig. 3, the head 36 will engage the connecting plate 29 and bodily move the shutter, which will move the sleeve 31 in a similar direction, and by this means cause the pin 33 to advance in the diagonal slot 32 to impart a rotative movement to the sleeve and shutter, which movement will be in the opposite direction from that in which the sleeve is turned when moving to the left as seen in Fig. 3.

Referring now to Figs. 4 and 5, assume that Fig. 4 shows the position which the shutter is in with respect to the light aperture while the machine is normally running, and assume that the member 26 is operated to frame the picture in a manner to throw the web 25 into the full line position of Fig. 5: This will cause the pin 38 to travel in the slot 41 in a direction to move the shaft 35 to the left when viewed as in Fig. 3, and cause the head 36 to advance outward, which will cause the stem 33 to act on the walls of the diagonal slot 32 to force the shutter outward and into engagement with the head and rotate the shutter in the direction of its arrow of Fig. 5. The rotation of the pinion 18 over the gear 17 would tend to turn said pinion in the direction of its arrow of Fig. 5, assuming the gear 17 to be turning in the direction of its arrow in said figure.

If this turning movement of the pinion were imparted to the shutter, the result would be an angular displacement of the shutter, so that it would not resume normal operation in the same angular relation to the light aperture that it maintained before the framing operation, and would thus be out of time. But, as will be seen, the influence of the stem 33 on the walls of the diagonal slot 32 is such as to move the shutter in a counter-direction from the direction of said abnormal movement, and hence maintain it in the same angular position it assumed to the light aperture previous to the framing operation, and it will thus resume normal operation in correct timing. If the web 25 be moved in a direction to carry it in the dotted line position of Fig. 5, the same result would be obtained, but in a directly opposite manner.

I claim:

1. In a motion-picture machine, the combination of film actuating mechanism, a shutter member, shutter operating mechanism, means for simultaneously and bodily swinging said mechanisms and member about a fixed center to frame the picture, and means for imparting supplemental movement to the shutter member during the framing operation to maintain it in correct angular relation with respect to the light aperture, substantially as described.

2. In a motion-picture machine, the combination of film actuating mechanism, a shutter member, shutter operating mechanism, a planetary gear drive between the film actuating and shutter operating mechanisms, means for simultaneously and bodily moving said mechanisms and member about the axis of the center gear of the planetary gear to frame the picture, and means for imparting supplemental movement to the shutter member during the framing operation to maintain it in correct angular relation with respect to the light aperture, substantially as described.

3. In a motion-picture machine, the combination of film actuating mechanism, a shutter member, shutter operating mechanism, means for simultaneously and bodily moving said mechanisms and member to frame the picture, said film actuating mechanism moving in a direction longitudinally of the film and the shutter operating mechanism and shutter in a direction crosswise of the film, and means for imparting supplemental movement to the shutter member during the framing operation to maintain it in correct angular relation to the light aperture, substantially as described.

4. In a motion-picture machine, the combination of film actuating mechanism, a shutter member, shutter operating mechanism, means for simultaneously and bodily moving said mechanisms and member to frame the picture, and means for imparting a supplemental combined rectilinear and turning movement to the shutter member during the framing operation to maintain it in correct angular relation to the light aperture, substantially as described.

5. In a motion-picture machine, the combination of film actuating mechanism, a shutter member, shutter operating mechanism, a shutter shaft, means for simultaneously and bodily moving said mechanisms, member and shaft to frame the picture, means for imparting a supplemental bodily movement to the shutter shaft and shutter member during the framing operation in a direction longitudinally of the shaft, and means for imparting a supplemental turning movement to the shutter member during the supplemental bodily movement thereof to maintain said member in correct angular relation to the light aperture, substantially as described.

6. In a motion-picture machine, the combination of film actuating mechanism, a shutter member, shutter operating mechanism, a shutter shaft, means for simultaneously and bodily moving said mechanisms, member and shaft to frame the picture, means of the character of a pin and diagonal slot for imparting a longitudinal movement to the shaft during the framing operation, means for imparting a supplemental movement to the shutter member in the direction of movement of the shaft and also a supplemental turning movement about its axis during the framing operation to maintain said member in correct angular relation to the light aperture, substantially as described.

7. In a motion-picture machine, the combination of film actuating mechanism, shutter operating mechanism, a shutter member, a shutter shaft, means for simultaneously and bodily moving said mechanisms, member and shaft to frame the picture, coöperating means for imparting a movement to said shaft and shutter longitudinally of the shaft and during the framing operation, and simultaneously imparting to the shutter a supplemental turning movement, said coöperating means comprising a pin and diagonal slot, and said movements of said shutter member maintaining the same in proper angular relation with respect to the light aperture, substantially as described.

8. In a motion-picture machine, the combination of film actuating mechanism, shutter operating mechanism, a shutter member, a shutter shaft, means for simultaneously and bodily moving said mechanisms, member and shaft to frame the picture, means of the character of a pin and diagonal slot for imparting a longitudinal movement to the shutter shaft during the framing operation, said shutter moving in correspondence to the movements of the shaft, and means of the character of a pin and diagonal slot for imparting a turning movement to the shutter member during its movement in accordance with the shaft, whereby said member is maintained in proper angular relation to the light aperture, substantially as described.

9. In a motion-picture machine, the combination of film actuating mechanism, a shutter member, a shutter shaft, shutter operating mechanism, means for simultaneously and bodily moving said mechanisms, member and shaft to frame the picture, a sleeve loose upon the shutter shaft and attached to the shutter, a driving connection to said sleeve for rotating the shutter, and means acting during the framing operation to impart a supplemental rotative movement to said sleeve, whereby the shutter is maintained in proper angular relation to the light aperture, substantially as described.

10. In a motion-picture machine, the combination of film actuating mechanism, shutter operating mechanism, a shutter member, means for simultaneously and bodily moving said mechanisms and member to frame the picture, means for holding the shutter against movement other than a turning movement about its axis, means for releasing said holding means during the framing operation to allow the shutter to have a supplemental bodily movement, and means for imparting a supplemental rotative movement to the shutter member during its bodily movement, whereby said member is maintained in correct angular relation to the light aperture, substantially as described.

11. In a motion-picture machine, the combination of film actuating mechanism, shutter operating mechanism, a shutter member, a shutter shaft, means for simultaneously and bodily moving said mechanisms, member and shaft to frame the picture, said shutter member being loosely mounted upon the shutter shaft, means for establishing a driving connection to said shutter member, a head on the end of the shutter shaft acting to hold the shutter against movement other than a rotative one about its center, means for moving said shaft during the framing operation, whereby said head is moved to allow the shutter to bodily move in accordance with the shaft, and means for imparting a turning movement to the shutter during said bodily movement, whereby it is maintained in proper angular relation to the light aperture, substantially as described.

12. In a motion-picture machine, the combination of film actuating mechanism, shutter operating mechanism, a shutter member, a shutter shaft, means for simultaneously and bodily moving said mechanisms, member and shaft to frame the picture, said shutter member being loosely mounted upon the shutter shaft, means for establishing a driving connection to rotate said shutter member, a head on the shutter shaft acting to hold the shutter member against movement other than a turning one about its axis, means of the character of a pin and diagonal slot for imparting a longitudinal movement to the shutter shaft during the framing operation, whereby said head is moved to allow the shutter to bodily move in accordance with the shaft, and means for imparting a turning movement to said shutter member during its bodily movement, whereby it is maintained in proper angular relation to the light aperture, substantially as described.

13. In a motion-picture machine, the combination of film actuating mechanism, shutter operating mechanism, a shutter member, a shutter shaft, means for simultaneously and bodily moving said mechanisms, member and shaft to frame the picture, a sleeve joined to the shutter member and loose upon the shaft, a driving connection to said sleeve for imparting a rotative movement to the shutter, a head on the end of the shaft for holding the shutter against movement other than a rotative one about its axis, means for moving said shaft during the framing operation to move the head and allow the member to move in accordance with the shaft, and means of the character of a pin and diagonal slot for imparting a rotative movement to said sleeve and shutter during the bodily movement of the shutter, whereby the shutter is maintained in correct angular relation to the light aperture, substantially as described.

CHRISTEN J. PETERSON.